(12) United States Patent
Wu

(10) Patent No.: US 7,666,933 B2
(45) Date of Patent: Feb. 23, 2010

(54) ORGANOSILANE MASTERBATCH

(75) Inventor: Lu-Liang Wu, Taipei (TW)

(73) Assignees: Degussa AG, Duesseldorf (DE); Evermore Trading Corporation, Taipei (TW)

( * ) Notice: Subject to any disclaimer, the term of this patent is extended or adjusted under 35 U.S.C. 154(b) by 1030 days.

(21) Appl. No.: 10/828,170

(22) Filed: Apr. 21, 2004

(65) Prior Publication Data

US 2004/0220307 A1 Nov. 4, 2004

(30) Foreign Application Priority Data

May 2, 2003 (EP) ................... 03010018

(51) Int. Cl.
*C08K 5/24* (2006.01)
(52) U.S. Cl. ...................... 524/261; 523/334
(58) Field of Classification Search .................. 524/261; 523/334
See application file for complete search history.

(56) References Cited

U.S. PATENT DOCUMENTS

| 4,436,847 | A | 3/1984 | Wagner |
| 4,474,908 | A | 10/1984 | Wagner |
| 5,159,009 | A | 10/1992 | Wolff et al. |
| 5,580,919 | A | 12/1996 | Agostini et al. |
| 5,916,956 | A | 6/1999 | Wang et al. |
| 6,342,552 | B1 | 1/2002 | Hergenrother et al. |
| 6,414,061 | B1 | 7/2002 | Cruse et al. |
| 6,512,035 | B1 | 1/2003 | Hergenrother et al. |
| 7,101,922 | B2 * | 9/2006 | Chen et al. ................. 523/334 |

FOREIGN PATENT DOCUMENTS

| EP | 0 994 150 | 4/2000 |
| EP | 1 101 802 | 5/2001 |
| WO | WO 02/46273 A2 | 6/2002 |

OTHER PUBLICATIONS

Identification of the Substance/Preparation and of the Company/Undertaking referring to Silicat®R, GE Specialty Materials (Suisse) Sarl, Switzerland (9 pages).
Materials Safety Data Sheet referring Struktol WB 16, Struktol Company of America, Stow, OH (4 pages).

* cited by examiner

*Primary Examiner*—Robert D. Harlan
(74) *Attorney, Agent, or Firm*—Oblon, Spivak, McClelland, Maier & Neustadt, L.L.P.

(57) ABSTRACT

An organosilane masterbatch containing (a) 2-20 parts by weight of rubber, (b) 0-60 parts by weight of filler, (c) 5-55 parts by weight of organosilane and (d) 0-10 parts by weight of dispersing agent. A process for preparing the organosilane masterbatch by mixing the rubber, filler, organosilane and dispersing agent in a banbury or kneader, extruding and cutting into pieces. Rubber mixtures containing the organosilane masterbatch can be used in rubber mixtures.

16 Claims, No Drawings

ORGANOSILANE MASTERBATCH

BACKGROUND OF THE INVENTION

1. Field of the Invention

The present invention relates to organosilane masterbatches, processes for their preparation, their use in rubber mixtures and products derived from or containing the organosilane master batches.

2. Description of the Related Art

Conventional organosilane compositions consisting of or consisting essentially of 30 to 60 weight-% of one or more organosilanes and 70 to 40 weight-% of carbon blacks are known (U.S. Pat. No. 4,128,438). Known organosilane compositions do not incorporate well into rubber compounds and may form in homogeneous mixtures. Disadvantages of known organosilane compositions include high bead abrasion of the granulate form during transport.

It is known that unvulcanized elastomer compositions can be prepared in multi-stage processes which include substantially dispersing a particulate filler selected from modified carbon blacks and sulfur crosslinking agent into a sulfur crosslinkable hydrocarbon elastomer to produce a substantially unvulcanized elastomer masterbatch. A sulfur crosslinking agent comprising sulfur or a sulfur donor is also added as a crosslinker for the hydrocarbon elastomer. The substantially unvulcanized elastomer composition is then prepared in at least one subsequent stage of the multi-stage process, for example by mechanical work-up of the masterbatch (U.S. Pat. No. 5,916,956).

A disadvantage of conventional elastomer compositions is that the rubber content is high when different rubbers are present in the masterbatch.

SUMMARY OF THE INVENTION

Accordingly, it is an object of the present invention to develop a new organosilane masterbatch with low bead abrasion during transport, good dispersion in rubber compounds and a low rubber content.

DETAILED DESCRIPTION OF THE PREFERRED EMBODIMENTS

In one embodiment, the invention provides an organosilane masterbatch comprising (a) 2-20 parts by weight, preferably 2 to 9 parts by weight, especially preferred 2 to 5 parts by weight of one or more rubbers, (b) 0-60 parts by weight, preferably 30 to 60 parts by weight, especially preferred 40 to 55 parts by weight of one or more fillers, (c) 5-55 parts by weight, preferably 15 to 55 parts by weight, especially preferred 45 to 55 parts by weight of one or more organosilanes and (d) 0-10 parts by weight, preferably 0.5 to 5 parts by weight, especially preferred 0.5 to 1.5 parts by weight of one or more dispersing agents.

The rubber may comprise, for example, naturally occurring rubber (NR), polybutadiene (PB), polyisoprene (IR), isobutylene/isoprene copolymers (IIR), butadiene/acrylonitrile copolymers with acrylonitrile contents of 5 to 60, preferably 10 to 50 wt. % (NBR), ethylene/propylene/diene copolymers (EPDM), styrene/butadiene copolymers (E-SBR or S-SBR) and mixtures of these rubbers. Synthetic rubbers that may be used in the invention are described, for example, in W. Hofmann, Kautschuktechnologie [Rubber Technology], Genter Verlag, Stuttgart 1980 (incorporated herein by reference).

The filler may include one or more carbon blacks. The carbon blacks may comprise ASTM carbon blacks, flame blacks, furnace blacks, channel blacks or gas blacks, rubber or pigment blacks or carbon black mixtures, preferably CORAX N 121, CORAX N 110, CORAX N 242, CORAX N 234, CORAX N 220, CORAX N 375, CORAX N 356, CORAX 347, CORAX N 339, CORAX N 332, CORAX N 330, CORAX N 326, CORAX N 550, CORAX N 539, CORAX N 683, CORAX N 660, CORAX N 774, CORAX N 765, CORAX N 650, CORAX N 762, DUREX 0, CORAX 3, CORAX 4, CORAX 9, CORAX P, PRINTEX P, CORAX S 315, CK 3, CORAX XE-1, PRINTEX L, PRINTEX L 6, CORAX L 29, PRINTEX XE2, FARBRUSS FW 200, FARBRUSS FW 2, FARBRUSS FW 2 V, FARBRUSS FW 1, FARBRUSS FW 18, SPEZIALRUSS 6, FARBRUSS S 170, FARBRUSS S 160, SPEZIALRUSS 5, SPEZIALRUSS 4, SPEZIALRUSS 4A, PRINTEX 150 T, PRINTEX U, PRINTEX V, PRINTEX 140 U, PRINTEX 140 V, PRINTEX 95, PRINTEX 90, PRINTEX 85, PRINTEX 80, PRINTEX 75, SPECIALRU.beta. 550, PRINTEX 55, PRINTEX 45, PRINTEX 40, PRINTEX 60, PRINTEX XE 2, PRINTEX L 6, PRINTEX L, PRINTEX 300, PRINTEX 30, PRINTEX 3, SPEZIALRUSS 350, PRINTEX 35, SPEZIALRUSS 250, PRINTEX 25, PRINTEX 200, PRINTEX A, SPEZIALRUSS 100, PRINTEX G, FLAMMRUSS 101, available from Degussa AG, described in "Information fur die Gummiindustrie" ("Information for the Rubber Industry"), Degussa AG, PT 39-4-05-1287 Ha and "Pigment Blacks" Degussa AG PT 80-0-11-10 86 Ha (each of which is incorporated herein by reference). The carbon blacks may optionally contain one or more heteroatoms such as e.g., Si.

The filler may also comprise or be glass fibres and glass fibre products (mats, strands) or microsize glass spheres separately or together with a carbon black.

The organosilane may be of formula I

$$Z-A-S_x-A-Z \quad (I)$$

in which x is a number from 1 to 12, preferably 1 to 8, particularly preferably 2 to 6, Z is equal to $SiX^1X^2X^3$ wherein $X^1, X^2, X^3$ may each mutually independently denote hydrogen (—H), halogen or hydroxy (—OH), an alkyl substituent, preferably methyl or ethyl, an alkenyl acid substituent, for example acetoxy R—(C═O)O—, or a substituted alkyl or alkenyl acid substituent, for example oximato $R^1{}_2C$═NO—, a linear or branched hydrocarbon chain with 1-6 carbon atoms, a cycloalkyl radical with 5-12 carbon atoms, a benzyl radical or a halogen- or alkyl-substituted phenyl radical, an alkoxy group, preferably ($C_1$-$C_4$) or ($C_{12}$-$C_{16}$) alkoxy, particularly preferably methoxy or ethoxy, with linear or branched hydrocarbon chains with ($C_{1-6}$) atoms, a cycloalkoxy group with ($C_{5-12}$) atoms, a halogen- or alkyl-substituted phenoxy group or a benzyloxy group, A is a ($C_1$-$C_{16}$), preferably ($C_1$-$C_4$), branched or unbranched, saturated or unsaturated, aliphatic, aromatic or mixed aliphatic/aromatic divalent hydrocarbon group.

The following compounds can for example be used as the organosilane of formula (I):

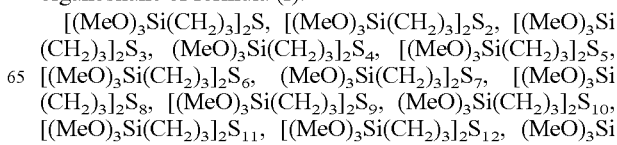

$[(MeO)_3Si(CH_2)_3]_2S$, $[(MeO)_3Si(CH_2)_3]_2S_2$, $[(MeO)_3Si(CH_2)_3]_2S_3$, $(MeO)_3Si(CH_2)_3]_2S_4$, $[(MeO)_3Si(CH_2)_3]_2S_5$, $[(MeO)_3Si(CH_2)_3]_2S_6$, $(MeO)_3Si(CH_2)_3]_2S_7$, $[(MeO)_3Si(CH_2)_3]_2S_8$, $[(MeO)_3Si(CH_2)_3]_2S_9$, $(MeO)_3Si(CH_2)_3]_2S_{10}$, $[(MeO)_3Si(CH_2)_3]_2S_{11}$, $[(MeO)_3Si(CH_2)_3]_2S_{12}$, $(MeO)_3Si$ (CH$_2$)$_3$]$_2$S, [(EtO)$_3$Si(CH$_2$)$_3$]$_2$S$_2$, [(EtO)$_3$Si(CH$_2$)$_3$]$_2$S$_3$, [(EtO)$_3$Si(CH$_2$)$_3$]$_2$S$_4$, [(EtO)$_3$Si(CH$_2$)$_3$]$_2$S$_5$, [(EtO)$_3$Si(CH$_2$)$_3$]$_2$S$_6$, [(EtO)$_3$Si(CH$_2$)$_3$]$_2$S$_7$, [(EtO)$_3$Si(CH$_2$)$_3$]$_2$S$_8$, [(EtO)$_3$Si(CH$_2$)$_3$]$_2$S$_9$, [(EtO)$_3$Si(CH$_2$)$_3$]$_2$S$_{10}$, [(EtO)$_3$Si(CH$_2$)$_3$]$_2$S$_{11}$, [(EtO)$_3$Si(CH$_2$)$_3$]$_2$S$_{12}$, (C$_3$H$_7$O)$_3$Si(CH$_2$)$_3$]$_2$S, [(C$_3$H$_7$O)$_3$Si(CH$_2$)$_3$]$_2$S$_2$, [(C$_3$H$_7$O)$_3$Si(CH$_2$)$_3$]$_2$S$_3$, (C$_3$H$_7$O)$_3$Si(CH$_2$)$_3$]$_2$S$_4$, [(C$_3$H$_7$O)$_3$Si(CH$_2$)$_3$]$_2$S$_5$, [(C$_3$H$_7$O)$_3$Si(CH$_2$)$_3$]$_2$S$_6$, (C$_3$H$_7$O)$_3$Si(CH$_2$)$_3$]$_2$S$_7$, [(C$_3$H$_7$O)$_3$Si(CH$_2$)$_3$]$_2$S$_8$, [(C$_3$H$_7$O)$_3$Si(CH$_2$)$_3$]$_2$S$_9$, (C$_3$H$_7$O)$_3$Si(CH$_2$)$_3$]$_2$S$_{10}$, [(C$_3$H$_7$O)$_3$Si(CH$_2$)$_3$]$_2$S$_{11}$ or [(C$_3$H$_7$O)$_3$Si(CH$_2$)$_3$]$_2$S$_{12}$.

The organosilane may comprise one or more organosilanes of the formula II $$Z-A-Y \quad (II)$$

in which

Z and A have the same meaning as in formula (I) above and Y is SH, SCN, S—C(O)—X$^1$, a straight-chain, branched or cyclic (C$_1$-C$_{18}$) alkyl, for example methyl, ethyl, n-propyl, n-butyl, n-pentyl, n-hexyl, isopropyl or tert-butyl, (C$_1$-C$_5$) alkoxy, for example methoxy, ethoxy, propoxy, butoxy, isopropoxy, isobutoxy or pentoxy, halogen, for example fluorine, chlorine, bromine or iodine, hydroxy, nitrile, (C$_1$-C$_4$) haloalkyl, —NO$_2$, (C$_1$-C$_8$) thioalkyl, —NH$^2$, —NHR$^1$, —NR$^1$R$^2$, alkenyl, allyl, vinyl, aryl or C$_7$-C$_{16}$) aralkyl.

The following compounds can for example be used as the organosilane of formula (II):

(EtO)$_3$—Si—(CH$_2$)$_3$—H, (MeO)$_3$—Si—(CH$_2$)$_3$—H, (EtO)$_3$—Si—(CH$_2$)$_8$—H, (MeO)$_3$—Si—(CH$_2$)$_8$—H, (EtO)$_3$—Si—(CH$_2$)$_{16}$—H, (MeO)$_3$—Si—(CH$_2$)$_{16}$—H, (Me)$_3$Si—(OMe), ((Et)$_3$Si—(OMe), (C$_3$H$_7$)$_3$Si—(OMe), (C$_6$H$_5$)$_3$Si—(OMe), (Me)$_3$Si—(OEt), ((Et)$_3$Si—(OEt), (C$_3$H$_7$)$_3$Si—(OEt), (C$_6$H$_5$)$_3$Si—(OEt), (Me)$_3$Si—(OC$_3$H$_7$), ((Et)$_3$Si—(OC$_3$H$_7$), (C$_3$H$_7$)$_3$Si—(OC$_3$H$_7$), (C$_6$H$_5$)$_3$Si—(OC$_3$H$_7$), (Me)$_3$SiCl, ((Et)$_3$SiCl, (C$_3$H$_7$)$_3$SiCl, (C$_6$H$_5$)$_3$SiCl, Cl$_3$—S$_1$—CH$_2$—CH=CH$_2$, (MeO)$_3$—S$_1$—CH$_2$—CH=CH$_2$, (EtO)$_3$—S$_1$—CH$_2$—CH=CH$_2$, C$_{13}$—Si—CH=CH$_2$, (MeO)$_3$—Si—CH=CH$_2$, (EtO)$_3$—Si—(CH$_2$)$_3$—SH or (EtO)$_3$—Si—CH=CH$_2$.

Examples of organosilanes which can be used in the invention include 3,3'-bis(trimethoxysilylpropyl) disulfide,
3,3'-bis(triethoxysilylpropyl) tetrasulfide,
3,3'-bis(trimethoxysilylpropyl) tetrasulfide,
2,2'-bis(triethoxysilylethyl) tetrasulfide,
3,3'-bis(trimethoxysilylpropyl) trisulfide,
3,3'-bis(triethoxysilylpropyl) trisulfide,
3,3'-bis(trimethoxysilylpropyl) hexasulfide,
2,2'-bis(methoxy diethoxy silyl ethyl) tetrasulfide,
2,2'-bis(tripropoxysilylethyl) pentasulfide,
bis(trimethoxysilylmethyl) tetrasulfide,
2,2'-bis(methyl dimethoxysilylethyl) trisulfide,
2,2'-bis(methyl ethoxypropoxysilylethyl) tetrasulfide,
5,5'-bis(dimethoxymethylsilylpentyl) trisulfide,
3,3'-bis(trimethoxysilyl-2-methoxypropyl) tetrasulfide,
5,5'-bis(triethoxysilylpentyl) tetrasulfide,
4,4'-bis(triethoxysilylbutyl) tetrasulfide,
3,3'-bis(diethoxymethylsilylpropyl) trisulfide,
bis(triethoxysilylmethyl) tetrasulfide,
3,3'-bis(dimethylethoxysilylpropyl) tetrasulfide,
3'-bis(dimethylmethoxysilylpropyl) tetrasulfide,
3,3'-bis(dimethylethoxysilylpropyl) disulfide,
3,3'-bis(dimethylmethoxysilylpropyl) disulfide,
3-mercaptopropyltriethoxysilane,
3-mercaptopropyltrimethoxysilane,
3,3'-bis(dodecanyldiethoxysilylpropyl) tetrasulfide,
3,3'-bis(didodecanylethoxysilylpropyl) tetrasulfide,
3,3'-bis(hexadecanyldiethoxysilylpropyl) tetrasulfide,
3,3'-bis(dihexadecanylethoxysilylpropyl) tetrasulfide,
3,3'-bis(dodecanyldiethoxysilylpropyl) disulfide,
3,3'-bis(didodecanylethoxysilylpropyl) disulfide,
3,3'-bis(hexadecanyldiethoxysilylpropyl) disulfide,
3,3'-bis(dihexadecanylethoxysilylpropyl) disulfide,
3-triethoxysilyl-1-propylthiooctoate,
3-trimethoxysilyl-1-propylthiooctoate,
3-triethoxysilyl-1-propylthiohexanoate,
3-trimethoxysilyl-1-propylthiohexanoate,
3-triethoxysilyl-1-propylthiobenzoate,
3-trimethoxysilyl-1-propylthiobenzoate or
3-thiocyanatopropyltriethoxysilane.

The organosilane may comprise Si 69, Si 108, Si 116, Si 118, Si 203, Si 208, Si 230, Si 264, Si 75 or Si 266, each available from Degussa AG.

The organosilane may be a mixture of one or more organosilanes of formulas I and/or II, together with one or more other organosilanes.

The dispersing agent may be one or more of the additives used in the rubber industry, preferably Struktol WB16 or Struktol WB212, available from Schill & Seilacher AG, Moorfleeter Strasse 28, 22113 Hamburg, Germany.

The organosilane masterbatch may further comprise one or more silicone oils.

The organosilane masterbatch may consist of (a) 2-20 parts by weight, preferably 2 to 9 parts by weight, especially preferably 2 to 5 parts by weight, of rubber, (b) 0-60 parts by weight, preferably 30 to 60 parts by weight, especially preferably 40 to 55 parts by weight, of filler, (c) 5-55 parts by weight, preferably 15 to 55 parts by weight, especially preferably 45 to 55 parts by weight, of organosilane and (d) 0-10 parts by weight, preferably 0.5 to 5 parts by weight, especially preferably 0.5 to 1.5 parts by weight, of dispersing agent.

Alternatively the organosilane may consist essentially of components (a), (b), (c) and (d) with one or more additional components that do not detrimentally affect the ability of for example the master batch to incorporate into rubber or to resist abrasion during transport.

The invention also provides a process for the production of the invention organosilane masterbatch including mixing the rubber, filler, organosilane and dispersing agent in a banbury or kneader, extruding and then cutting the mixture.

The mixing in the banbury or kneader can be carried out at temperatures of from 20° to 100° C., preferably from 60° to 80° C. The mixing period can be from 1 to 20 minutes, preferably from 5 to 15 minutes.

Extrusion of the masterbatch-may be carried out in conventional extruding machine. The cut masterbatch may be cooled on a conveyor system.

The present invention also includes rubber mixtures which contain the organosilane masterbatch of the invention.

The organosilane masterbatch according to the invention may be present in a rubber mixture in quantities of 0.1 to 20 wt. %, relative to the quantity of rubber.

The rubber compounds according to the invention can be used for producing moldings, for example, for the production of pneumatic tires, tire treads, cable coverings, flexible tubes, drive belts, conveyor belts, roller coatings, tires, shoe soles, washers and damping elements.

The organosilane masterbatch according to the invention has the advantage that the bead abrasion is low during transport, the dispersion into rubber is good and the rubber content is very low.

EXAMPLE 1

Organosilane Masterbatch

There was weighed into a 75 l Banbury 4 kg of E-SBR, 45 kg of N 330, 50 kg of Si 69 and 1 kg of Struktol WB212. All ingredients were mixed for 10 minutes below 80° C.

Afterwards the organosilane masterbatch was extruded in a conventional extruder at a temperature lower than 80° C.

The extrudated organosilane masterbatch was cut into pieces of approx 0.5 cm and then cooled on a conveyor system.

The organosilane masterbatch has no fine content unlike X 50-S (approx 15%).

EXAMPLE 2

The organosilane masterbatch of Example 1 was tested in a NR radial truck tread compound. The unit phr means parts by weight relative to 100 parts of rubber used. The formulation used for the rubber compounds is described in Table 1 below.

TABLE 1

| INGREDIENT | Compound 1 Reference | Compound 2 | Compound 3 Reference |
|---|---|---|---|
| STR 5L (ML1 + 4 = 70) | 100 | 100 | 100 |
| Corax N115 | 20 | 20 | 20 |
| Ultrasil 7000 GR | 30 | 30 | 30 |
| Example 1 | 0 | 9 | 0 |
| X 50-S | 0 | 0 | 9 |
| ZnO RS | 3 | 3 | 3 |
| Stearic acid | 2 | 2 | 2 |
| Antilux 654 | 1 | 1 | 1 |
| Vulkanox 4020 | 1.5 | 1.5 | 1.5 |
| Vulkanox HS/LG | 1 | 1 | 1 |
| Aromatic oil #2 | 3 | 3 | 3 |
| Vulkacit NZ/EG | 1.3 | 1.3 | 1.3 |
| Vulkacit D | 0.8 | 0.8 | 0.8 |
| Sulfur | 1.5 | 1.5 | 1.5 |

Polymer STR 5L (ML1+4=70) is a natural rubber with a Mooney viscosity 70 MU.

Corax N115 is an ASTM carbon black from Degussa AG. Ultrasil 7000 GR is a readily dispersible precipitated silica from Degussa AG with a BET surface area of 175 m$^2$/g. The product X 50 S is a 1:1 mixture of Si 69 (Bis(triethoxysilylpropyl)tetrasulfane) and of a HAF carbon black from Degussa AG. Antilux 654 is antiozonant from RheinChemie, Vulkanox 4020(6PPD) is antioxidants with antiozonant effects from Bayer AG, and Vulkanox HS/LG(TMQ) is antioxidants without antiozonant effects from Bayer AG. Vulkacit NZ/EG and Vulkacit D are vulcanization accelerators from Bayer AG.

The rubber mixtures were prepared in an internal mixer in accordance with the mixing instructions in Table 2.

TABLE 2

Stage 1

| Settings | |
|---|---|
| Mixing unit | Werner & Pfleiderer GK1.5N |
| Speed | 75 rpm |
| Plunger pressure | 5.5 bar |
| Empty volume | 1.45 L |
| Filling level | |
| Flow temp | 80° C. |
| Mixing operation | |
| 0 to 1 min | Polymer |
| 1 to 2.5 min | ¾ N115/Ultrasil 7000 GR, X 50-S, ZnO RS, Stearic acid, Antilux 654, Vulkanox 4020, Vulkanox HS/LG |
| 2.5 to 4.5 min | ¼ N115/Ultrasil 7000 GR, Aromatic oil #2 |
| 4 min | clean |
| 5 min | Mix & Dump |
| Batch temp. | 150-160° C. |
| Storage | 4 h at room temperature |

Stage 2

| Settings | |
|---|---|
| Mixing unit | as in stage 1 except |
| Speed | 30 rpm |
| Filling level | |
| Flow temp | 50° C. |
| Mixing operation | |
| 0 to 2 min | batch stage 1, Vulkacit NZ/EG, Vulkacit D, Sulfur |
| 2 min | deliver and form skin on laboratory roll mill, (diameter 200 mm, length 450 mm, flow temperature 50° C.) Homogenization: cut in 3* left, 3* right and fold over and turn over 3* for a wide roll nip (1 mm) and 3* for a narrow roll nip (3.5 mm) draw out a rolled sheet |
| Batch temp | <120° C. |

The methods for rubber testing are summarized in Table 3.

TABLE 3

| Physical testing | Standard/Conditions |
|---|---|
| MS 1 + 4, 2rd stage | DIN 53523 |
| MS 1 + 4 (100° C.) | |
| MS t5, MS t35 (121° C.) | |
| Vulcameter test, ODR 150° C., 60 min | ASTM D 2084 |
| ML, MH (dNm) | |
| t10%, t90%, t95% (min) | |
| Tensile test on ring, 23° C. | DIN 53504 |
| Tensile strength (MPa) | |
| Moduli (MPa) | |
| Elongation at break (%) | |
| Shore A hardness, 23° C. (SH) | DIN 53 505 |
| Die C Tear | ASTM D624 |
| Trouser Tear | DIN 53507 |
| DIN abrasion (mm$^3$), 10 N load | DIN 53 516 |
| Spec. Gravity | ASTM D297 |
| Dispersion Topography (%) | ISO/DIS 11345 |

Table 4a and 4b shows the result of the rubber testing.

TABLE 4a

| | | Compound 1 Reference | Compound 2 | Compound 3 Reference |
|---|---|---|---|---|
| ODR/150° C., 60 min | | | | |
| ML | (dNm) | 8.8 | 8.0 | 7.8 |
| MH | (dNm) | 39.2 | 48.3 | 49.4 |
| MH − ML | (dNm) | 30.4 | 40.4 | 41.6 |
| t10% | (min) | 4.4 | 4.1 | 3.9 |

TABLE 4a-continued

|  |  | Compound 1 Reference | Compound 2 | Compound 3 Reference |
|---|---|---|---|---|
| t90% | (min) | 8.4 | 12.8 | 12.1 |
| t95% | (min) | 9.5 | 17.5 | 16.6 |
| t90% − t10% | (min) | 4.0 | 8.7 | 8.2 |
| MOONEY DATA |  |  |  |  |
| MS 1 + 4 (100° C.) | (MU) | 58 | 59 | 59 |
| MS t5 (121° C.) | (min) | 28 | 20 | 19 |
| MS t35 (121° C.) | (min) | 36 | 26 | 24 |

TABLE 4b

|  |  | Compound 1 Reference | Compound 2 | Compound 3 Reference |
|---|---|---|---|---|
| DUMBBELL |  | 12' | 25' | No need |
| TENSILE STRENGTH | (MPa) | 24.6 | 22.4 | 24.5 |
| 100% MODULUS | (MPa) | 1.6 | 2.9 | 3.2 |
| 200% MODULUS | (MPa) | 3.3 | 7.5 | 8.2 |
| 300% MODULUS | (MPa) | 6.4 | 13.7 | 14.6 |
| ELONGATION | (%) | 620 | 430 | 450 |
| DIE C TEAR | (N/min) | 96 | 135 | 115 |
| TROUSER TEAR | (N/min) | 34 | 24 | 26 |
| REBOUND | (%) | 51 | 51 | 50 |
| SHORE A HARDNESS |  | 62 | 68 | 70 |
| DIN ABRASION | (mm$^3$) | 166 | 119 | 112 |
| SPEC. GRAVITY |  | 1.121 | 1.135 | 1.136 |
| TOPOGRAPHY | (%) | 2.83 | 2.77 | 2.32 |

Comparison is made between truck tread compounds with and without silane in typical NR truck tread compound (Table 4a/4b). Compound 2 contains 9 phr of the organosilane masterbatch made according to the invention (Example 1). Compound 3 contain X 50-S which is a mixture of 50% Si 69 and 50% HAF carbon black. As can be seen in the properties (Compound 2), the use of the organosilane masterbatch of the invention, improves modulus, abrasion, heat generation, and don't have any dispersion problem, versus the reference Compound 1. The improvements are comparable to those using X 50-S (Compound 3).

European application EP 03010018.4 filed on May 2, 2003 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

The invention claimed is:

1. An organosilane masterbatch comprising
    (a) 2 to 9 parts by weight of one or more rubbers,
    (b) 30 to 60 parts by weight of one or more carbon black fillers, wherein said fillers are the only fillers in the organosilane masterbatch,
    (c) 15 to 55 parts by weight of one or more organosilanes, and
    (d) 0.5 to 5 parts by weight of one or more dispersing agents.

2. The organosilane masterbatch according to claim 1, wherein the rubber is at least one of E-SBR or S-SBR.

3. The organosilane masterbatch according to claim 1, wherein the organosilane is of formula I $$Z-A-S_x-A-Z \qquad (I)$$

wherein x is a number from 1 to 12;

Z is $SiX^1X^2X^3$ wherein $X^1$, $X^2$, $X^3$ can each mutually or independently be a hydrogen, a halogen, a hydroxy, an alkyl substituent, an alkenyl acid substituent, a linear hydrocarbon chain with 1-6 carbon atoms, a branched hydrocarbon chain with 1-6 carbon atoms, a cycloalkyl radical with 5-12 carbon atoms, a benzyl radical, a halogen-substituted phenyl radical, an alkyl-substituted phenyl radical, an alkoxy group with one or more linear or branched hydrocarbon chains having from 1 to 6 carbon atoms, a cycloalkoxy group having 1 to 5 carbon atoms, a halogen-substituted phenoxy group, an alkyl-substituted phenoxy group or a benzyloxy group;

A is a $C_1$-$C_{16}$ branched or unbranched, saturated or unsaturated, aliphatic, aromatic or mixed aliphatic/aromatic divalent hydrocarbon group or an organosilane of formula II $$Z-A-Y \qquad (II)$$

wherein

Z and A have the same meaning as in formula (I) and

Y is SH, SCN, S—C(O)—$X^1$, a straight-chain ($C_1$-$C_{18}$) alkyl, a branched ($C_1$-$C_{18}$) alkyl, a cyclic ($C_1$-$C_{18}$) alkyl, a ($C_1$-$C_5$) alkoxy, a halogen, a hydroxy, a nitrile, a ($C_1$-$C_4$) haloalkyl, —$NO_2$, a ($C_1$-$C_8$) thioalkyl, —$NH_2$, —$NHR^1$, —$NR^1R^2$, an alkenyl, an allyl, a vinyl, an aryl or a ($C_7$-$C_{16}$) aralkyl.

4. The organosilane masterbatch according to claim 3, wherein the organosilane is at least one selected from the group consisting of
    3,3'-bis(trimethoxysilylpropyl) disulfide,
    3,3'-bis(triethoxysilylpropyl) tetrasulfide,
    3,3'-bis(trimethoxysilylpropyl) tetrasulfide,
    2,2'-bis(triethoxysilylethyl) tetrasulfide,
    3,3'-bis(trimethoxysilylpropyl) trisulfide,
    3,3'-bis(triethoxysilylpropyl) trisulfide,
    3,3'-bis(trimethoxysilylpropyl) hexasulfide,
    2,2'-bis(methoxy diethoxy silyl ethyl) tetrasulfide,
    2,2'-bis(tripropoxysilylethyl) pentasulfide, bis(trimethoxysilylmethyl) tetrasulfide,
    2,2'-bis(methyl dimethoxysilylethyl) trisulfide,
    2,2'-bis(methyl ethoxypropoxysilylethyl) tetrasulfide,
    5,5'-bis(dimethoxymethylsilylpentyl) trisulfide,
    3,3'-bis(trimethoxysilyl-2-methoxypropyl) tetrasulfide,
    5,5'-bis(triethoxysilylpentyl) tetrasulfide,
    4,4'-bis(triethoxysilylbutyl) tetrasulfide,
    3,3'-bis(diethoxymethylsilylpropyl) trisulfide,
    bis(triethoxysilylmethyl) tetrasulfide,
    3,3'-bis(dimethylethoxysilylpropyl) tetrasulfide,
    3,3-bis(dimethylmethoxysilylpropyl) tetrasulfide,
    3,3'-bis(dimethylethoxysilylpropyl) disulfide,
    3,3'-bis(dimethylmethoxysilylpropyl) disulfide,
    3-mercaptopropyltriethoxysilane,
    3-mercaptopropyltrimethoxysilane,
    3,3'-bis(dodecanyldiethoxysilylpropyl) tetrasulfide,
    3,3'-bis(didodecanyldiethoxysilylpropyl) tetrasulfide,
    3,3'-bis(hexadecanyldiethoxysilylpropyl) tetrasulfide,
    3,3'-bis(dihexadecanyldiethoxysilylpropyl) tetrasulfide,
    3,3'-bis(dodecanyldiethoxysilylpropyl) disulfide,
    3,3-bis(didodecanylethoxysilylpropyl) disulfide,
    3,3'-bis(hexadecanyldiethoxysilylpropyl) disulfide,
    3,3'-bis(dihexadecanylethoxysilylpropyl) disulfide,
    3-triethoxysilyl-1-propylthiooctoate,
    3-trimethoxysilyl-1-propylthiooctoate,
    3-triethoxysilyl-1-propylthiohexanoate,
    3-trimethoxysilyl-1-propylthiohexanoate, 3-triethoxysilyl-1-propylthiobenzoate,
3-trimethoxysilyl-1-propylthiobenzoate and
3-thiocyanatopropyltriethoxysilane.

5. The organosilane masterbatch of claim 1, comprising (a) from 2 to 5 parts by weight of the rubber, (b) from 40 to 55 parts by weight of the filler, (c) from 45 to 55 parts by weight of the organosilane and (d) from 0.5 to 1.5 parts by weight of the dispersing agent.

6. The organosilane masterbatch of claim 3, wherein x is from 1 to 8.

7. The organosilane masterbatch of claim 3, wherein x is from 2 to 6.

8. The organosilane masterbatch of claim 1, wherein the organosilane is bis(triethoxysilylpropyl)tetrasulfane.

9. The organosilane masterbatch of claim 1, wherein the rubber is E-SBR, the filler is a pelletized carbon black, the organosilane is bis(triethoxysilylpropyl)tetrasulfane and the dispersing agent is a blend of high molecular weight aliphatic fatty acid esters and condensation products bound to chemically inert fillers.

10. The organosilane masterbatch of claim 1, obtained by mixing the rubber, the filler, the organosilane and the dispersing agent in a banbury mixer or a kneader to form a mixture, extruding the mixture and then cutting the extruded mixture to form a granulate.

11. A rubber-containing composition comprising the organosilane masterbatch according to claim 1.

12. An article of manufacture comprising the rubber-containing composition of claim 11.

13. The article of manufacture of claim 12 selected from the group consisting of a molding, a pneumatic tire, a tire tread, a cable covering, a flexible tube, a drive belt, a conveyor belt, a roller coating, a tire, a shoe sole, a washer and a damping element.

14. A vulcanized rubber composition comprising the organosilane composition of claim 1.

15. A process for the production of the organosilane masterbatch according to claim 1, comprising:

mixing the rubber, the filler, the organosilane and the dispersing agent in a banbury mixer or a kneader to form a mixture, extruding the mixture, and cutting the extruded mixture to form the organosilane masterbatch as a granulate.

16. The process as claimed in claim 15, wherein the temperature is below 80° C.

* * * * *